United States Patent Office.

SARAH L. FEATHERS, OF PRAIRIE CITY, IOWA.

COMPOUND FOR BLEACHING POTATOES, &c.

SPECIFICATION forming part of Letters Patent No. 373,448, dated November 22, 1887.

Application filed November 23, 1886. Serial No. 219,683. (No specimens.)

*To all whom it may concern:*

Be it known that I, SARAH L. FEATHERS, a citizen of the United States of America, and a resident of Prairie City, in the county of Jasper and State of Iowa, have invented a Compound and Process for Drying and Preserving Potatoes, of which the following is a specification.

My invention consists in forming a compound of solids and a liquid for curing, bleaching, drying, and condensing potatoes and analogous substances, as hereinafter set forth, and pointed out in my claim, in such a manner that bulky and perishable products can be advantageously packed and shipped and preserved ready for use at any time and in any climate.

To make a compound of solids adapted to be put up in packages as an article of merchandise, and also adapted to produce a liquid for bleaching and preserving vegetable matter, I take about one pound of granulated or pulverized cream of tartar and about three pounds of pure salt and mix the same. Any quantity of this compound may be mixed by hand or machinery, in about the proportions of one part of cream of tartar and three parts of salt, and put up in paper boxes, glass jars, or other suitable receptacles, to facilitate handling the same as an article of merchandise for family use in practicing my method of curing and drying vegetable matter.

To condense, bleach, dry, and preserve potatoes I make a liquid by dissolving four pounds (4 lbs.) of my compound of solids in about eight (8) gallons of pure water, preferably hot, and then pare and slice as large a quantity of potatoes as can be immersed in the said liquid at one time. Any amount of liquid desired at one time can be readily made in corresponding proportions of the cream of tartar, salt, and water without first mixing the solids. To prepare the potatoes, as required, to prevent them from being colored dark when dried in an oven or evaporator by means of artificial heat, the sun and air, or in any suitable means of drying and desiccating, after the sliced potatoes have absorbed sufficient of the liquid by letting them remain therein five (5) minutes or more, I take them out and dry them, preferably in shallow pans or trays placed in an oven or evaporator, in which artificial heat can be introduced and the temperature regulated to dry them rapidly without browning, scorching, or burning them. The cream of tartar and salt or their chemical equivalents thus applied cure and preserve the sugar and starch and other component parts, and also bleach the substance, so that when dried crisp and hard it will have a clear bright natural tint and entirely free from the dark musty color incident to the raw surface of potatoes exposed to the air or dried by natural or artificial heat. Potatoes thus dried and cured can be put up in packages and handled as an improved article of merchandise, the same as other dried vegetables and fruits, and readily cooked and utilized as food in a common way, or ground into flour to be used for all the purposes for which potato-flour is adapted.

I am aware that potatoes have been cut and sliced and dipped in a salt brine and then dried; but the use of cream of tartar for the purpose of bleaching, curing, and preserving potatoes, onions, apples, and other tubers, vegetables, and fruits is novel and greatly advantageous.

I claim as my invention—

The herein-described composition of matter to be used for bleaching and preserving potatoes and analogous substances, consisting of cream of tartar, salt, and water, in about the proportions specified.

SARAH L. FEATHERS.

Witnesses:
R. H. ORWIG,
THOMAS G. ORWIG.